(12) United States Patent
Wang et al.

(10) Patent No.: US 8,429,162 B1
(45) Date of Patent: Apr. 23, 2013

(54) FACILITATING DATA REDISTRIBUTION IN DATABASE SHARDING

(75) Inventors: Weinan Wang, Bellevue, WA (US); Joseph E. Magerramov, Seattle, WA (US); Maxym Kharchenko, Bellevue, WA (US); Min Zhu, Bellevue, WA (US); Aaron D. Kujat, Issaquah, WA (US); Alessandro Gherardi, Bellevue, WA (US); Jason C. Jenks, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 27 days.

(21) Appl. No.: 13/246,371

(22) Filed: Sep. 27, 2011

(51) Int. Cl.
*G06F 7/00* (2006.01)
*G06F 17/30* (2006.01)

(52) U.S. Cl.
USPC .......................................... 707/737; 707/756

(58) Field of Classification Search .................. 707/737, 707/999.101, 756
See application file for complete search history.

(56) References Cited

U.S. PATENT DOCUMENTS

| | | | |
|---|---|---|---|
| 6,366,945 B1 * | 4/2002 | Fong et al. ..................... | 718/104 |
| 7,355,977 B1 * | 4/2008 | Li ................................. | 370/235.1 |
| 7,801,912 B2 * | 9/2010 | Ransil et al. .................. | 707/770 |
| 7,979,771 B2 * | 7/2011 | Margolus et al. ............. | 714/752 |
| 2008/0021908 A1 * | 1/2008 | Trask et al. .................. | 707/999.1 |
| 2010/0293332 A1 * | 11/2010 | Krishnaprasad et al. ..... | 711/119 |
| 2011/0145540 A1 * | 6/2011 | Duisenberg et al. .......... | 711/173 |

OTHER PUBLICATIONS

DeCandia et al., "Dynamo: Amazon's Highly Available Key-Value Store", in the Proceedings of the 21st ACM Symposium on Operating Systems Principles. Oct. 2007. Retrieved on Dec. 6, 2012 from http://www.allthingsdistributed.com/files/amazon-dynamo-sosp2007.pdf.*

Brad Anderson. "Dynamo and CouchDB Clusters," Cloudant. Aug. 13, 2010. Retrieved on Dec. 6, 2012 from https://cloudant.com/blog/dynamo-and-couchdb-clusters/.*

Stoica et al., "Chord: A Scalable Peer-to-peer Lookup Service for Internet Applications," SIGCOMM'01, Aug. 27-31, 2001, San Diego, California. Retrieved on Dec. 6, 2012 from http://pdos.csail.mit.edu/papers/chord:sigcomm01/chord_sigcomm.pdf.*

Sybase, "Multiple and composite partition keys and range partitioning," 2006. Retrieved on Dec. 6, 2012 from http://infocenter.sybase.com/help/index.jsp?topic=/com.sybase.dc34982_1500/html/mig_gde/mig_gde74.htm.*

Sasirekha R., "Database Sharding—Horizontal Partitioning for massive scalability" IT Knowledge Exchange, Sep. 24, 2010. Retrieved on Dec. 10, 2012 from http://itknowledgeexchange.techtarget.com/enterprise-IT-tech-trends/database-sharding-horizontal-partitioning-for-massive-scalability/.*

U.S. Appl. No. 13/246,437 entitled "Increasing Distributed Database Capacity," which was filed Sep. 27, 2011.

* cited by examiner

*Primary Examiner* — Apu Mofiz
*Assistant Examiner* — Bryan Walker
(74) *Attorney, Agent, or Firm* — Thomas | Horstemeyer, LLP

(57) ABSTRACT

Disclosed are various embodiments for facilitating data redistribution in database sharding. A database is maintained that is horizontally partitioned into a set of first buckets using modulo-based assignments. A fixed number of the first buckets are stored in each of multiple physical data stores. The database is repartitioned into a set of second buckets using modulo-based assignments. The number of second buckets in the set is a multiple of the sum of a positive integer and the quantity of the physical data stores. The data in the database is unmoved between the physical data stores by repartitioning.

19 Claims, 7 Drawing Sheets

FACILITATING DATA REDISTRIBUTION IN DATABASE SHARDING

BACKGROUND

Sharding refers to the horizontal partitioning of a database among multiple physical data stores. In relational database management systems, data is organized into tables containing rows and columns. Each row corresponds to an instance of a data item, and each column corresponds to an attribute for the data item. Sharding produces partitions by rows instead of columns. Through partitioning, the data in a single table may be spread among potentially many different physical data stores, thereby improving scalability.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating data redistribution in database sharding. In database sharding, data items from a database may be organized into "buckets," which are then mapped to physical data stores. For example, the primary key, or a portion thereof, for a data item may be hashed, thereby generating a hash code. The modulo operator may be applied, with the hashcode being the dividend and the number of buckets being the divisor. The resulting remainder may be used to assign the data item to one of the buckets. This approach yields an even distribution of the primary keys among the buckets. For even distribution of the primary keys among the data stores, the number of buckets is a multiple of the number of data stores.

Various embodiments of the present disclosure facilitate data redistribution when the number of data stores is increased. If the number of data stores is to be increased, the number of buckets is also increased if the number of buckets is not a multiple of the number of data stores. Accordingly, a new number of buckets may be generated, where the new number of buckets is a multiple of the new number of data stores. The data items are reassigned to the new buckets and remain in place in their respective data stores under the existing mapping. Subsequently, data corresponding to some of the buckets may be relocated to the new data stores. In the following discussion, a general description of the system and its components is provided, followed by a discussion of the operation of the same.

Figure 1:
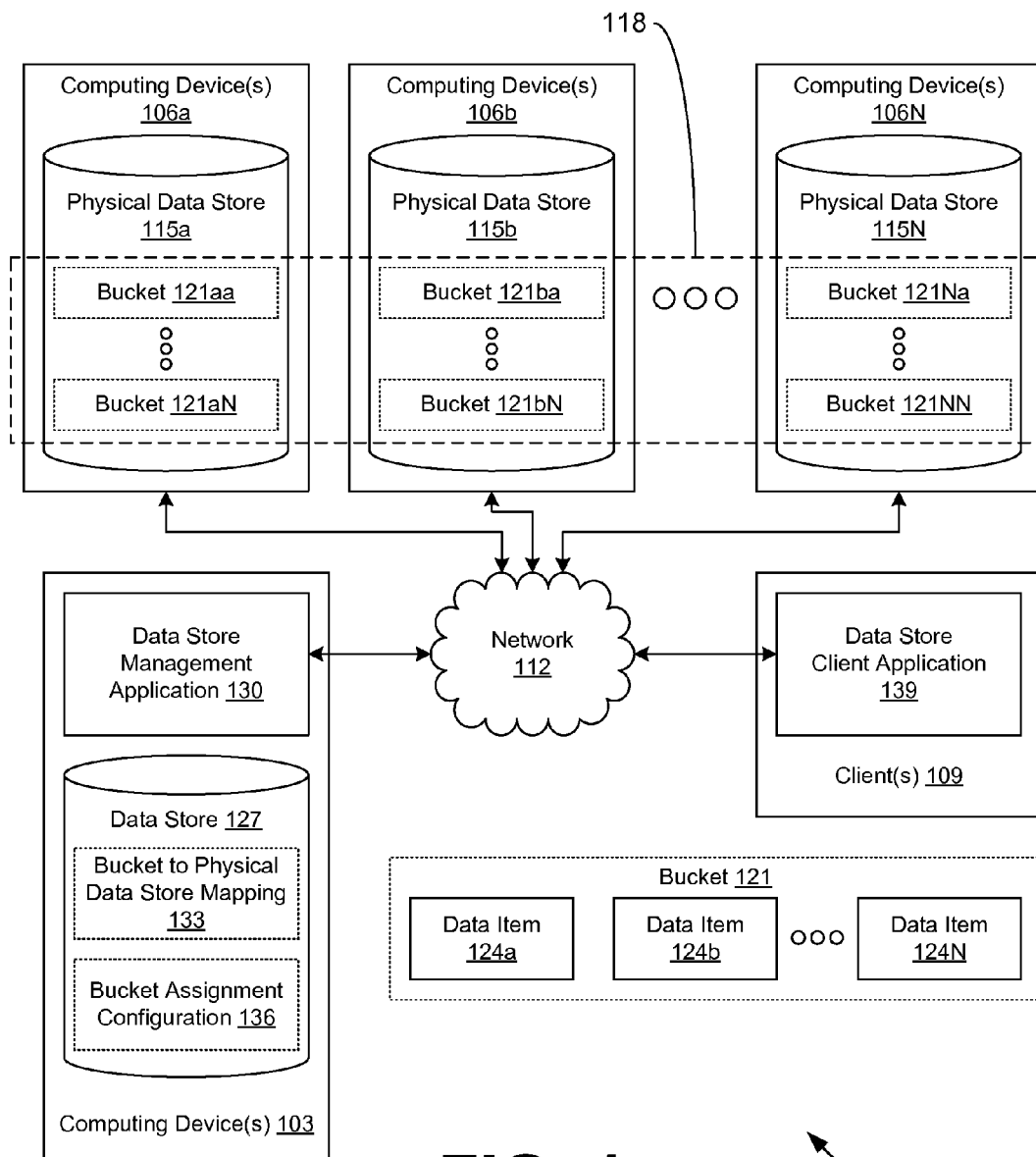
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of computing devices 106a, 106b ... 106N and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing devices 106 may each comprise, for example, a server computer or any other system providing computing capability. Alternatively, each of the computing devices 106 may represent a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, each computing device 106 is referred to herein in the singular. Even though each computing device 106 is referred to in the singular, it is understood that a plurality of computing devices 106 may be employed in the various arrangements as described above. Each of the computing devices 106 includes one or more data storage devices.

Each of the computing devices 106 includes a respective one of a plurality of physical data stores 115a, 115b ... 115N. The physical data stores 115 collectively store a horizontally partitioned database 118. The respective data from the database 118 that is stored by each one of the physical data stores 115 may be referred to as a shard or a horizontal partition. Such a shard or horizontal partition corresponds to a plurality of buckets 121. In some embodiments, multiple physical data stores 115 may be hosted by one computing device 106. However, in other devices 106 to improve performance and scalability. In some of these embodiments, a single physical data store 115 may be hosted by multiple computing devices 106 to further improve performance.

The buckets 121 stored by the physical data store 115a comprise a plurality of buckets 121a as ... 121aN. The buckets 121 stored by the physical data store 115b comprise a plurality of buckets 121ba ... 121bN. The buckets 121 stored by the physical data store 115N comprise a plurality of buckets 121Na ... 121NN. Each bucket 121 corresponds to a respective grouping of a plurality of data items 124a, 124b ... 124N from the database 118. With a database 118 that is a relational database, the data items 124 may correspond to rows from one or more tables. The data items 124 are assigned to particular buckets 121 using a modulus-based mapping to distribute the data items 124 evenly across the buckets 121. The buckets 121, in turn, are mapped to one of the physical data stores 115.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 127 that is accessible to the computing device 103. The data store 127 may be representative of a plurality of data stores 127 as can be appreciated. The data stored in the data store 127, for example, is associated with the operation of the various applications and/or functional entities described below.

The components executed on the computing device 103, for example, include a data store management application 130 and other applications, services, processes, systems, engines, or functionality not discussed in detail herein. The data store management application 130 is executed to maintain the database 118 stored in the physical data stores 115. To this end, the data store management application 130 is configured to store data items 124 in the database 118 and obtain data items 124 or portions thereof from the database 118. The data store management application 130 also may repartition the database 118 into buckets 121 and add or remove physical data stores 115 with redistribution of data from the database 118 as will be described.

The data stored in the data store 127 includes, for example, a bucket to physical data store mapping 133, a bucket assignment configuration 136, and potentially other data. The bucket to physical data store mapping 133 defines which buckets 121 are stored in which physical data stores 115. The bucket assignment configuration 136 controls assignment of data items 124 to buckets 121 by the data store management application 130. Additionally, the bucket assignment configuration 136 may be used to determine a bucket 121 to which a data item 124 has been assigned.

The client 109 is representative of a plurality of client devices that may be coupled to the network 112. The client 109 may comprise, for example, a processor-based system such as a computer system. Such a computer system may be embodied in the form of a desktop computer, a server computer, a laptop computer, personal digital assistants, cellular telephones, smartphones, set-top boxes, music players, web pads, tablet computer systems, game consoles, electronic book readers, or other devices with like capability. The client 109 may include a display comprising, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a data store client application 139 and/or other applications. The data store client application 139 is employed to access data items 124 or portions thereof which are stored in the database 118. The data store client application 139 may also store and/or update data items 124 stored in the database 118. The data store client application 139 may employ structured query language (SQL) and/or other interfaces. In some embodiments, the data store client application 139 may be executed in the computing device 103. The client 109 may be configured to execute applications beyond the data store client application 139 such as, for example, browser applications, mobile applications, email applications, instant message applications, and/or other applications.

Next, a general description of the operation of the various components of the networked environment 100 is provided. To begin, a database 118 is configured to use multiple physical data stores 115 to store data. The database 118 is partitioned into buckets 121, with at least one bucket 121 being stored in each physical data store 115. The same number of buckets 121 are stored in each physical data store 115 to facilitate equal distribution of data items 124 to the physical data stores 115. The bucket to physical data store mapping 133 records which of the buckets 121 are stored in which of the physical data stores 115.

Data items 124 are assigned to buckets 121 through a procedure controlled by the bucket assignment configuration 136. For example, a key or other standardized portion of a data item 124 may be hashed, and the resulting hash value may be assigned to one of the buckets 121 using a modulo-based assignment. The modulo-based assignment may be stored in association with the data item 124 or determined dynamically in response to accessing the data item 124.

In one non-limiting example, the database 118 stores data relating to an electronic marketplace with multiple merchants. It may be desired that the data of each merchant be stored in one physical data store 115. Thus, the data items 124 stored by the merchant may include a merchant identifier. The bucket 121 assignment may be derived from the merchant identifier to ensure that data of the merchant is stored in one bucket 121 and one physical data store 115.

After the database 118 is initially configured, an increased number of buckets 121 may be desired for various reasons. For example, it may be easier to backup the database 118 if it is partitioned into a greater number of buckets 121 with each bucket 121 holding less data. To this end, the number of buckets 121 may be increased by some multiple of the number of buckets 121 so that each bucket 121 is divided into the same number of smaller buckets 121. The multiple may be selected in order to migrate buckets 121 to additional physical data stores 115. However, no data migration is necessary to accomplish repartitioning into a new number of buckets 121. An example of bucket 121 repartitioning and data migration to additional physical data stores 115 will next be described in connection with the following four figures.

Figure 2A:
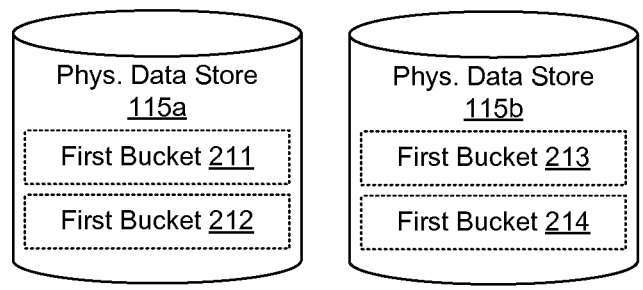
FIGS. 2A-2D are drawings depicting various stages of data redistribution among physical data stores in the networked environment of FIG. 1 according to various embodiments of the present disclosure.

Turning now to FIGS. 2A-2D, shown are drawings depicting various stages of data redistribution among a plurality of physical data stores 115 in the networked environment 100 (FIG. 1) according to various embodiments. FIG. 2A shows two physical data stores 115a and 115b which are used to store data items 124 (FIG. 1) from a database 118 (FIG. 1). The physical data store 115a is mapped to two first buckets 211 and 212. The physical data store 115b is also mapped to two first buckets 213 and 214. It is noted that each physical data store 115 is mapped to an equal number of buckets 121 (FIG. 1) to provide for an equal distribution of data assignments across the physical data stores 115. At the least, each physical data store 115 will have one bucket 121, but a physical data store 115 may store many buckets 121 in some cases.

Figure 2B:
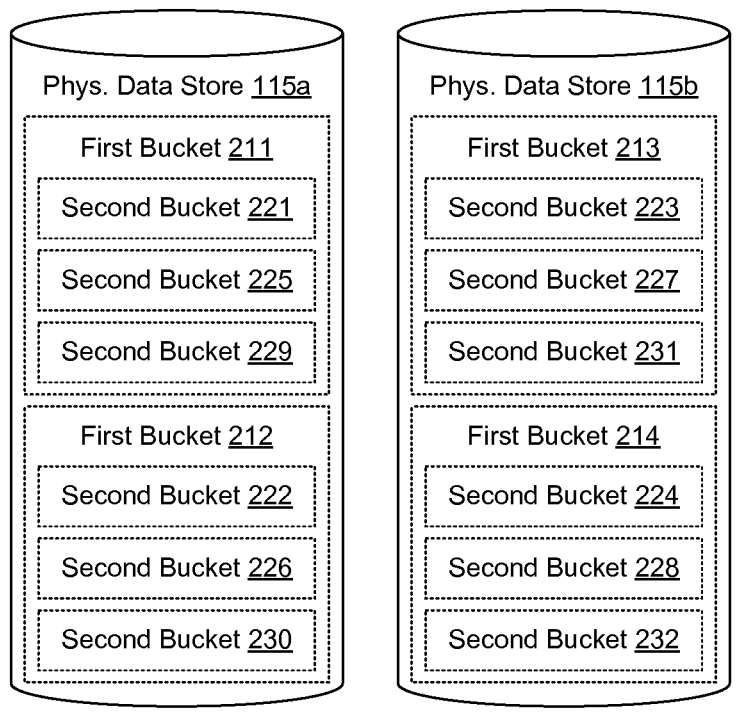

FIG. 2B illustrates the physical data stores 115a and 115b from FIG. 2A after repartitioning to increase the number of buckets 121 (FIG. 1). The buckets 121 according to the previous configuration are referred to as first buckets 121, while the buckets 121 according to the new configuration are referred to second buckets 121. In the non-limiting example of FIG. 2B, each first bucket 121 is divided into three second buckets 121. In the physical data store 115a, the first bucket 211 is divided into second buckets 221, 225, and 229, and the first bucket 212 is divided into second buckets 222, 226, and 230. In the physical data store 115b, the first bucket 213 is divided into second buckets 223, 227, and 231, and the first bucket 214 is divided into second buckets 224, 228, and 232.

It is noted that each one of the first buckets 211, 212, 213, and 214 is divided into the same number of second buckets 121. The total number of second buckets 121 may be selected, for example, to be a multiple of a new number of physical data stores 115. Also, in this non-limiting example, the identifier for each second bucket 121 may be derived from the identifier for the respective first bucket 121.

To illustrate, the first bucket 212 may have an identifier i1 of "2." The identifiers i2 of the second buckets 222, 226, and 230 may be determined according to the equation: i2=i1+k*n, where k is the number of first buckets 121 and n is a non-negative integer less than the number of second buckets 121 divided by k. Here, k equals 4, the number of second buckets 121 equals 12, and n equals the set of {0, 1, 2}. Therefore, the set of i2 is {2, 6, 10}, which corresponds to the identifiers for second buckets 222, 226, and 230. It is noted that the reference numerals for the second buckets 121 are intentionally selected to be 220 plus the identifier described above, to fit with this example.

Figure 2C:
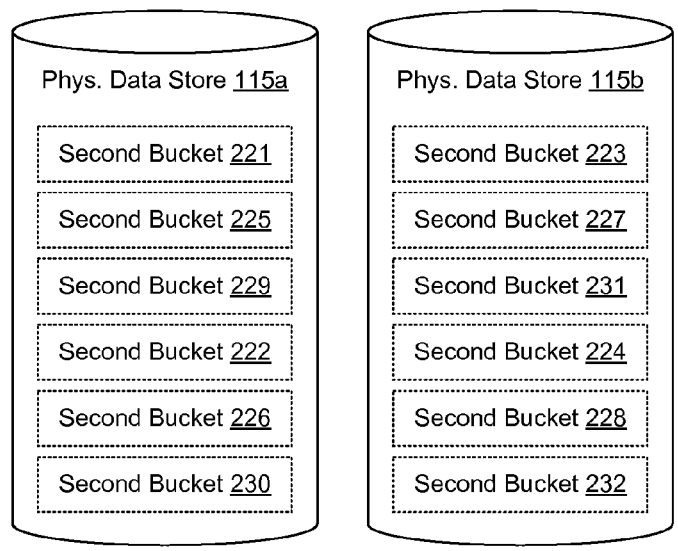

FIG. 2C illustrates the result of this repartitioning. The physical data store 115a stores the second buckets 221, 225, 229, 222, 226, and 230. The physical data store 115b stores the second buckets 223, 227, 231, 224, 228, and 232. It is noted that each of the physical data stores 115a and 115b stores an equal number of buckets 121 (FIG. 1), which facilitates an equal distribution of data items 124 (FIG. 1) to each of the physical data stores 115.

Figure 2D:
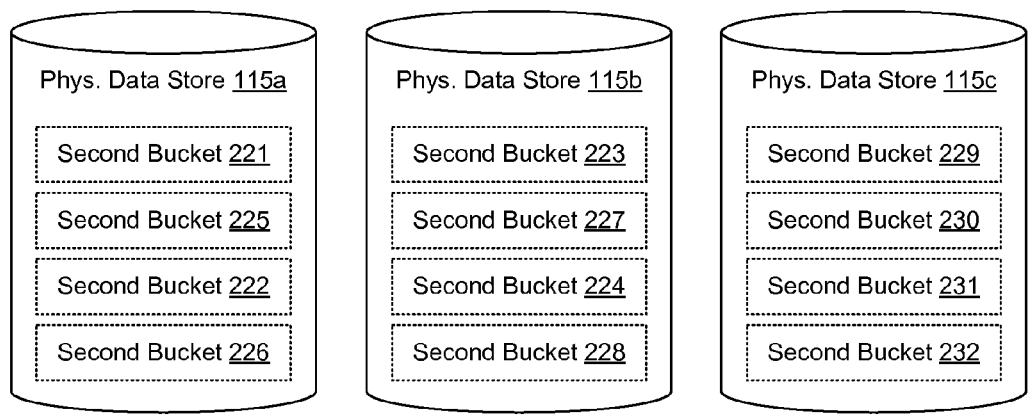

FIG. 2D depicts the addition of a new physical data store 115c and a redistribution of data items 124 (FIG. 1) from the other physical data stores 115a and 115b to the physical data store 115c. In FIG. 2D, the second buckets 229, 230, 231, and 232 have been migrated to the physical data store 115c, with the second buckets 229 and 230 coming from the physical data store 115a and the second buckets 231 and 232 coming from the physical data store 115b (see FIG. 2C). An equal number of buckets 121 (FIG. 1) are migrated from each of the physical data stores 115a and 115b, with the result being that each of the physical data stores 115a, 115b, and 115c stores an equal number of buckets 121 after the redistribution. Although specific buckets 121 are illustrated as being moved to the physical data stores 115c in this example, any four of the buckets 121 may be moved as desired.

Figure 3A:
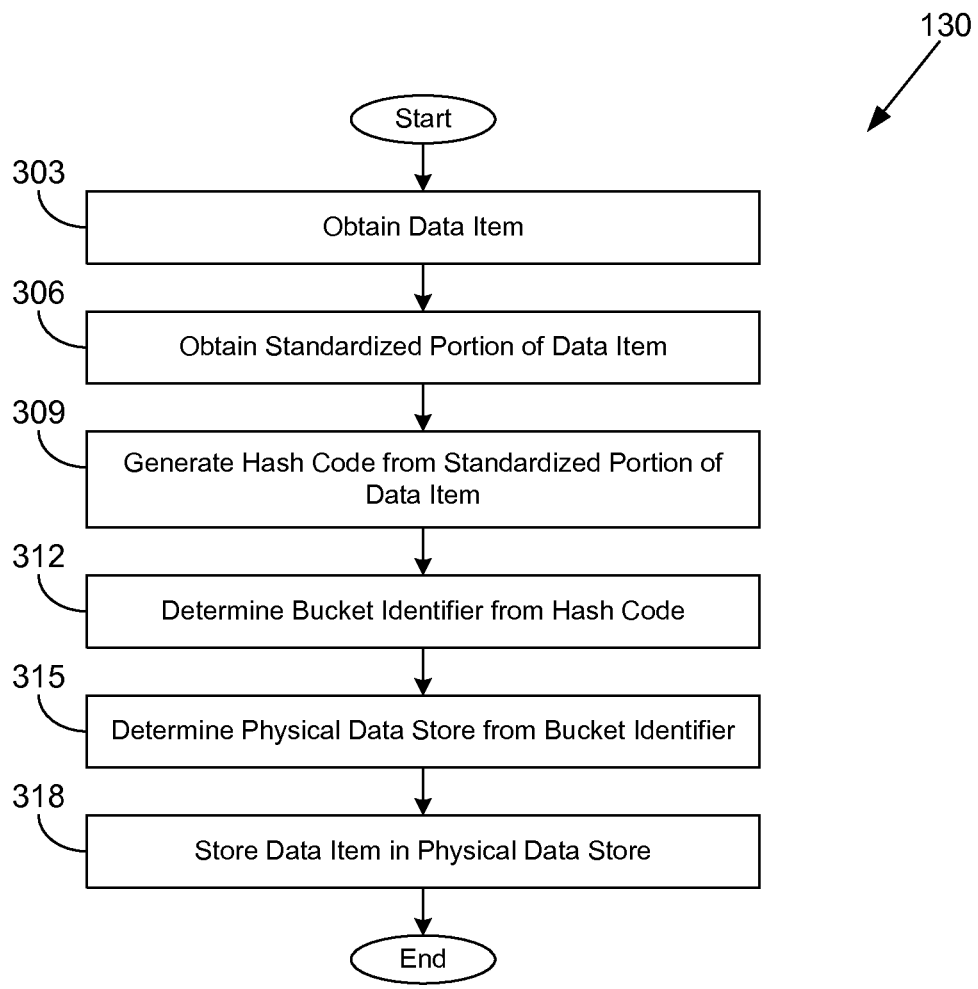
FIGS. 3A-3C are flowcharts illustrating examples of functionality implemented as portions of a data store management application executed in a computing device in the networked environment of FIG. 1 according to various embodiments of the present disclosure.

Referring next to FIG. 3A, shown is a flowchart that provides one example of the operation of a portion of the data store management application 130 according to various embodiments. In particular, the flowchart of FIG. 3A relates to storage of a data item 124 (FIG. 1) in the database 118 (FIG. 1). It is understood that the flowchart of FIG. 3A provides merely an example of the many different types of functional arrangements that may be employed to implement the operation of the portion of the data store management application 130 as described herein. As an alternative, the flowchart of FIG. 3A may be viewed as depicting an example of steps of a method implemented in the computing device 103 (FIG. 1) according to one or more embodiments.

Beginning with box 303, the data store management application 130 obtains a data item 124. For example, the data item 124 may be supplied by a data store client application 139 (FIG. 1) as part of an SQL insert or update statement. In box 306, the data store management application 130 obtains a standardized portion of the data item 124. The standardized portion may correspond, for example, to a primary key or a portion thereof. In box 309, the data store management application 130 generates a hash code by applying a hash function to the standardized portion of the data item 124.

In box 312, the data store management application 130 determines a bucket identifier from the hash code. The bucket identifier uniquely identifies a bucket 121 (FIG. 1). In one embodiment, the data store management application 130 applies the modulus operation to the hash code, which is used as the dividend, and to the number of buckets, which is used as the divisor. The result of the modulus operation may be used directly as the bucket identifier or may be transformed in some way to arrive at the bucket identifier. In another embodiment, the bucket identifier may be determined according to a mapping of data items 124 to buckets 121. The determination of the bucket identifier may be controlled in part by settings in the bucket assignment configuration 136 (FIG. 1).

In box 315, the data store management application 130 determines a physical data store 115 (FIG. 1) from the bucket identifier. To this end, the data store management application 130 may consult the bucket to physical data store mapping 133 (FIG. 1). In box 318, the data store management application 130 stores, or updates, the data item 124 in the physical data store 115 determined in box 315. In one embodiment, the data store management application 130 may store the bucket identifier along with the data item 124. Thereafter, the portion of the data store management application 130 ends.

Figure 3B:
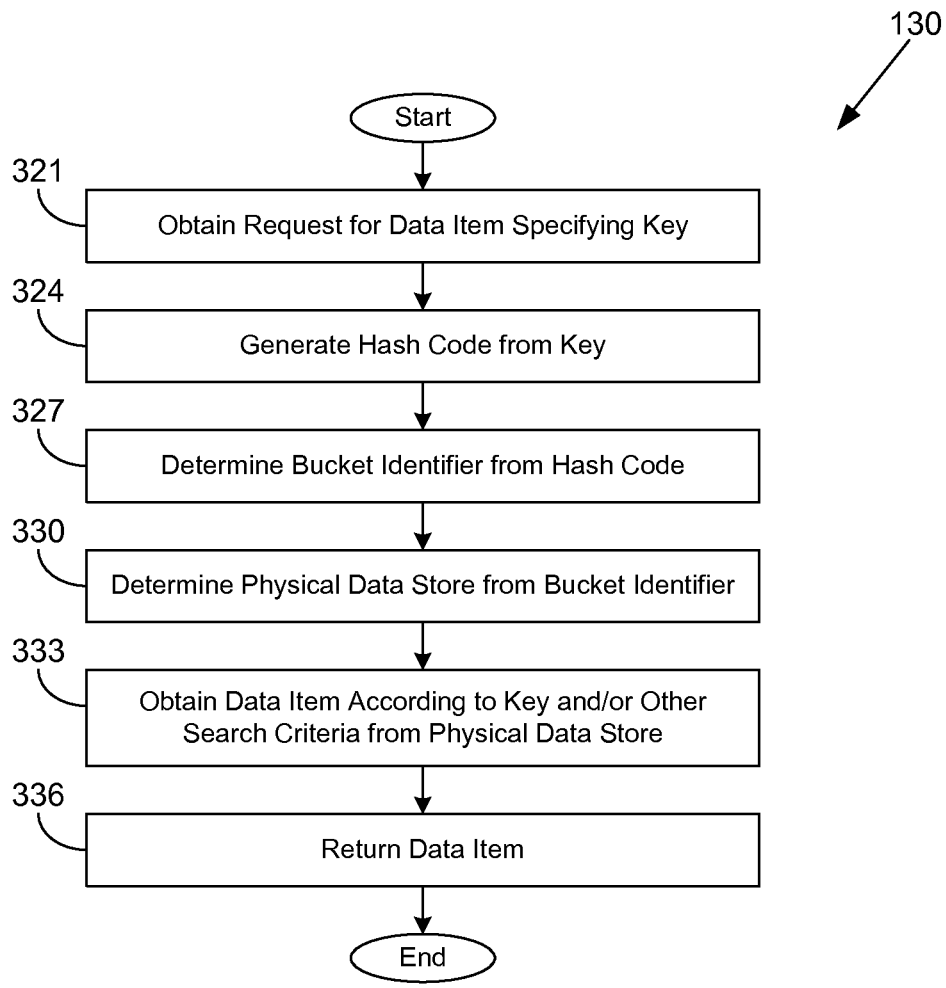

Turning now to FIG. 3B, shown is a flowchart that provides one example of the operation of another portion of the data store management application 130 according to various embodiments. Specifically, the flowchart of FIG. 3B relates to obtaining a data item 124 (FIG. 1) from a database 118 (FIG. 1). It is understood that the flowchart of FIG. 3B provides merely an example of the many different types of functional arrangements that may be employed to implement the operation of the other portion of the data store management application 130 as described herein. As an alternative, the flowchart of FIG. 3B may be viewed as depicting an example of steps of a method implemented in the computing device 103 (FIG. 1) according to one or more embodiments.

Beginning with box 321, the data store management application 130 obtains a request for a data item 124, where the request specifies a key that identifies the data item 124. For example, the request may be obtained from a data store client application 139 (FIG. 1) and may correspond to a select SQL statement. In box 324, the data store management application 130 generates a hash code by applying a hash function to the key or a portion of the key.

In box 327, the data store management application 130 determines a bucket identifier from the hash code. In one embodiment, the data store management application 130 may apply a modulus operation to determine the bucket identifier, i.e., the bucket identifier equals the hash code modulo the number of buckets 121 (FIG. 1). The result of the modulus operation may be transformed in some way to arrive at the bucket identifier. The determination of the bucket identifier from the key may be controlled at least in part by stored settings in the bucket assignment configuration 136 (FIG. 1).

In box 330, the data store management application 130 determines a physical data store 115 (FIG. 1) from the bucket identifier according to the bucket to physical data store mapping 133 (FIG. 1). In box 333, the data store management application 130 obtains the data item 124 according to the key and/or other search criteria from the physical data store 115 determined in box 330. In box 336, the data store management application 130 returns the data item 124. Thereafter, the portion of the data store management application 130 ends.

Figure 3C:
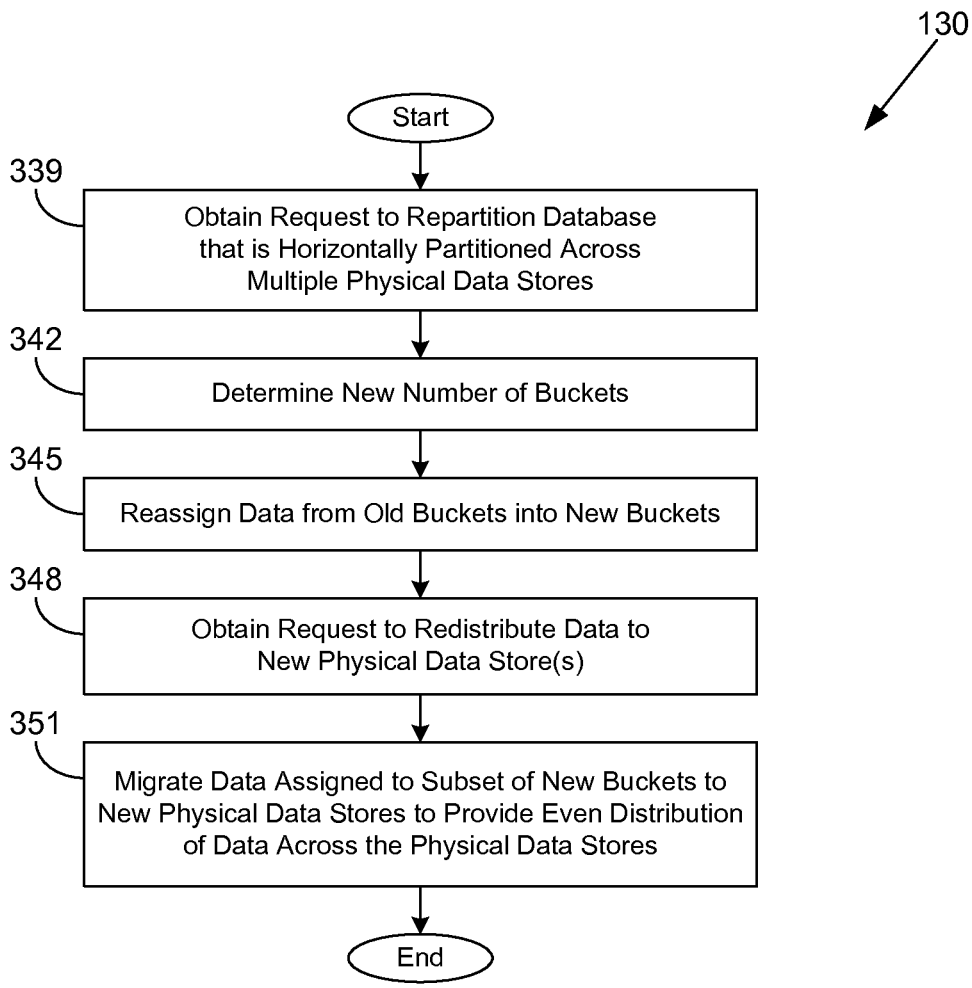

Moving on to FIG. 3C, shown is a flowchart that provides one example of the operation of yet another portion of the data store management application 130 according to various embodiments. In particular, the flowchart of FIG. 3C relates to the redistribution of data items 124 (FIG. 1) in the database 118 (FIG. 1) considering the addition of one or more new physical data stores 115 (FIG. 1). It is understood that the flowchart of FIG. 3C provides merely an example of the many different types of functional arrangements that may be employed to implement the operation of the other portion of the data store management application 130 as described herein. As an alternative, the flowchart of FIG. 3C may be viewed as depicting an example of steps of a method implemented in the computing device 103 (FIG. 1) according to one or more embodiments.

Beginning with box 339, the data store management application 130 obtains a request to repartition a database 118 that is horizontally partitioned across multiple physical data stores 115. For example, the request may be obtained from the data store client application 139 (FIG. 1). In box 342, the data store management application 130 determines a new number of buckets 121 (FIG. 1).

In one example, the new number of buckets 121 may be selected to be a multiple of the existing number of buckets 121 and of a new number of physical data stores 115. In another example, the new number of buckets 121 may be selected to be a multiple of the existing number of buckets 121 plus a positive integer. In yet another example, the new number of buckets 121 may be selected to be a multiple of the sum of a positive integer and the previous quantity of the physical data stores 115.

Once the new number of buckets 121 is determined, the data store management application 130 reassigns data items 124 from the old bucketing arrangement to the new bucketing arrangement in box 345. In this reassignment, the data items 124 remain unmoved among the physical data stores 115. In one embodiment, new bucket identifiers may be stored along with the data items 124 in the database 118. In another embodiment, the bucket assignment configuration 136 (FIG. 1) is updated so that dynamically generated bucket identifiers correspond to the new bucket identifiers.

In box 348, the data store management application 130 obtains a request to redistribute data items 124 to newly added physical data stores 115. Such a request may automatically follow the bucket 121 reassignment or may be manually generated by a data store client application 139 (FIG. 1). In box 351, the data store management application 130 migrates data items 124 that are assigned to a subset of the new buckets 121 to the new physical data stores 115. The quantity of the buckets 121 moved to each new physical data store corresponds to the number of buckets 121 divided by the total number of physical data stores 115. The migration provides for an even distribution of the data items 124 across the physical data stores 115. Thereafter, the portion of the data store management application 130 ends.

Figure 4:
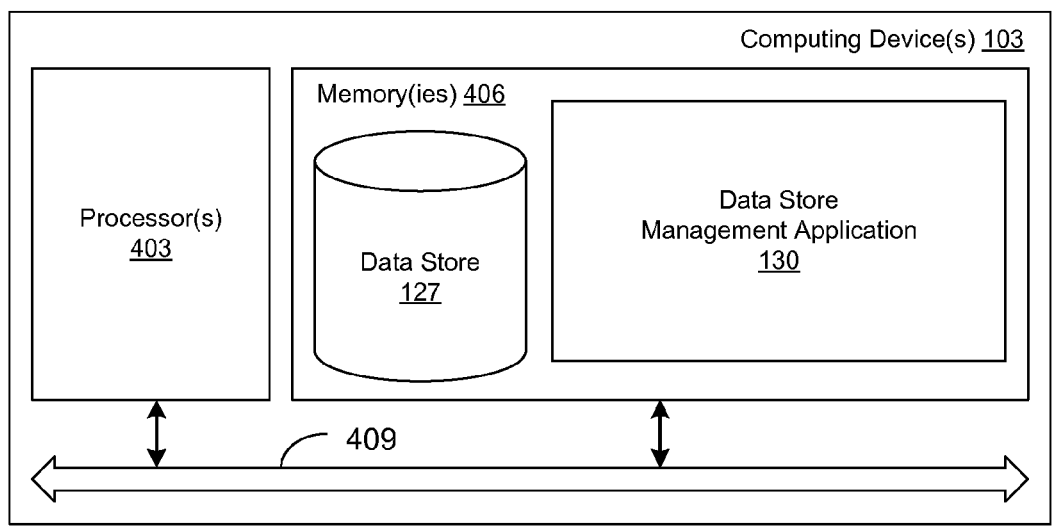
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data store management application 130 and potentially other applications. Also stored in the memory 406 may be a data store 127 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although data store management application 130, the data store client application 139 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-3C show the functionality and operation of an implementation of portions of the data store management application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIGS. 3A-3C may be executed concurrently or with partial concurrence. Further, in some embodiments, one or more of the blocks shown in 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 130 and the data store client application 139, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that maintains a database that is stored in a plurality of physical data stores through horizontal partitioning, the database including a plurality of data items;
    code that assigns each one of the data items to one of a plurality of first buckets by generating a respective hash code from a standardized portion of the one of the data items and determining the hash code modulo the number of first buckets, wherein a first fixed number of the first buckets are stored in each of the physical data stores according to a mapping;
    code that reassigns each one of the data items to one of a plurality of second buckets by determining the hash code modulo the number of second buckets, the number of second buckets corresponding to a multiple of the number of first buckets plus a positive integer;
    code that updates the mapping to map a second fixed number of the second buckets to each of the physical data stores, wherein the data items are unmoved between the physical data stores by updating the mapping;
    code that adds at least one physical data store to the plurality of physical data stores;
    code that migrates the data items which are assigned to a subset of the second buckets to the at least one physical data store added by the code that adds; and
    code that updates the mapping to map a third fixed number of the second buckets to each of the physical data stores, wherein an even distribution of the second buckets is achieved among the physical data stores.

2. The non-transitory computer-readable medium of claim 1, wherein each of the first buckets is identified by a respective first bucket identifier i1, each of the second buckets is identified by a respective second bucket identifier i2, and data assigned to i1 are assigned to a subset of the set of second buckets selected according to the equation: $i2=i1+k*n$, where k is the number of first buckets and n is a non-negative integer less than the number of second buckets divided by k.

3. The non-transitory computer-readable medium of claim 1, wherein the program further comprises code that determines one of the physical data stores in which a given one of the data items is stored by:
    generating the respective hash code for the given one of the data items;
    generating a second bucket identifier based at least in part on the hash code modulo the number of second buckets; and
    determining the one of the physical data stores that corresponds to the second bucket identifier according to the mapping.

4. A system, comprising:
   a plurality of physical data stores;
   at least one computing device including a processor and a memory; and
   a data store management application executable in the at least one computing device, the data store management application comprising:
      logic that maintains a database of data that is horizontally partitioned into a set of first buckets using modulo-based assignments, a fixed number of the first buckets being stored in each one of the physical data stores; and
      logic that repartitions the database into a set of second buckets using modulo-based assignments, the number of second buckets in the set being a multiple of the sum of a positive integer and the quantity of the physical data stores, wherein the data in the database is unmoved between the physical data stores by repartitioning, wherein each of the first buckets is identified by a respective first bucket identifier i1, each of the second buckets is identified by a respective second bucket identifier i2, and data assigned to i1 are assigned to a subset of the set of second buckets selected according to the equation: $i2=i1+k*n$, where k is the number of first buckets and n is a non-negative integer less than the number of second buckets divided by k.

5. The system of claim 4, wherein the data store management application further comprises logic that determines a modulo-based assignment for a data item in the database by generating a hash code from a standardized portion of the data item and calculating the modulo-based assignment based at least in part on a result of the hash code modulo a quantity of buckets.

6. The system of claim 5, wherein the standardized portion of the data item corresponds to a key.

7. The system of claim 4, wherein the fixed number is an integer greater than one.

8. The system of claim 4, wherein the modulo-based assignments are stored in association with the data.

9. The system of claim 4, wherein the modulo-based assignments are determined dynamically in response to accessing the data.

10. The system of claim 4, wherein the data store management application further comprises:
   logic that adds at least one other physical data store to the physical data stores, the positive integer corresponding to the quantity of the at least one other physical data store; and
   logic that migrates the data in the database corresponding to a subset of the second buckets to the at least one other physical data store.

11. The system of claim 10, wherein the logic that migrates further comprises logic that updates a mapping of the second buckets to the physical data stores.

12. A method, comprising the steps of:
   maintaining a plurality of physical data stores corresponding to horizontal partitions of a database containing a plurality of data items, wherein each data item in the database is assigned to a respective one of a plurality of first buckets, the data items assigned to each respective first bucket are stored in a mapped one of the physical data stores;
   reassigning, by a computing device, for each of the first buckets, each one of the data items which are assigned to the first bucket to a second bucket in a corresponding subset of a set of second buckets, the corresponding subset being different for each first bucket, each of the second buckets in the corresponding subset being stored in the mapped one of the physical data stores corresponding to the first bucket, the number of second buckets in the corresponding subset being a fixed number for all of the first buckets; and
   wherein the data items are unmoved between the physical data stores by the reassigning step, and wherein each of the first buckets is identified by a respective first bucket identifier i1, each of the second buckets is identified by a respective second bucket identifier i2, and data assigned to i1 are assigned to a subset of the set of second buckets selected according to the equation: $i2=i1+k*n$, where k is the number of first buckets and n is a non-negative integer less than the number of second buckets divided by k.

13. The method of claim 12, wherein each one of the data items is associated with a key, and the method further comprises the step of assigning, by the computing device, each one of the data items to one of the first buckets by performing the steps of:
   generating, by the computing device, a hash code from the key of the one of the data items;
   determining, by the computing device, the first bucket identifier i1 by calculating the hash code modulo the number of first buckets; and
   assigning, by the computing device, the one of the data items to the one of the first buckets corresponding to the first bucket identifier i1.

14. The method of claim 13, wherein the step of assigning, by the computing device, the one of the data items to the one of the first buckets corresponding to the first bucket identifier i1 further comprises the step of storing, by the computing device, the first bucket identifier i1 in association with the one of the data items.

15. The method of claim 12, wherein each one of the data items is associated with a key, and the reassigning step further comprises the steps of:
   for each one of the data items:
      generating, by the computing device, a hash code from the key of the one of the data items;
      determining, by the computing device, the second bucket identifier i2 by calculating the hash code modulo the number of second buckets; and
      reassigning, by the computing device, the one of the data items to the second bucket corresponding to the second bucket identifier i2.

16. The method of claim 15, wherein the step of reassigning, by the computing device, the one of the data items to the second bucket corresponding to the second bucket identifier i2 further comprises the step of storing, by the computing device, the second bucket identifier i2 in association with the one of the data items, the second bucket identifier i2 replacing the first bucket identifier i1.

17. The method of claim 12, further comprising the steps of:
   adding, by the computing device, at least one physical data store to the plurality of physical data stores, producing a new quantity of physical data stores; and
   wherein a total number of the second buckets is a multiple of the new quantity of physical data stores.

18. The method of claim 17, further comprising the step of migrating, by the computing device, the data items that are assigned to a subset of second buckets in each corresponding plurality of second buckets from the mapped one of the physical data stores to the at least one physical data store that has been added.

19. The method of claim 12, further comprising the step of determining, by the computing device, one of the physical data stores in which a given one of the data items is stored by performing the steps of:
- generating, by the computing device, a hash code for the given one of the data items;
- generating, by the computing device, the second bucket identifier i2 based at least in part on the hash code modulo the number of second buckets; and
- determining, by the computing device, the one of the physical data stores that corresponds to the second bucket identifier i2.

* * * * *